(12) United States Patent
Xiao et al.

(10) Patent No.: US 11,841,807 B2
(45) Date of Patent: Dec. 12, 2023

(54) METHOD, APPARATUS FOR MANAGING PERIPHERAL DEVICE FOR ELECTRONIC DEVICE, ELECTRONIC DEVICE AND MEDIUM

(71) Applicant: Jingdong Technology Information Technology Co., LTD, Beijing (CN)

(72) Inventors: Jun Xiao, Beijing (CN); Huapeng Ge, Beijing (CN)

(73) Assignee: Jingdong Technology Information Technology Co., LTD, Beijing (CN)

( * ) Notice: Subject to any disclaimer, the term of this patent is extended or adjusted under 35 U.S.C. 154(b) by 0 days.

(21) Appl. No.: 17/638,016

(22) PCT Filed: Aug. 14, 2020

(86) PCT No.: PCT/CN2020/109311
§ 371 (c)(1),
(2) Date: Feb. 24, 2022

(87) PCT Pub. No.: WO2021/047349
PCT Pub. Date: Mar. 18, 2021

(65) Prior Publication Data
US 2022/0276971 A1    Sep. 1, 2022

(30) Foreign Application Priority Data
Sep. 10, 2019  (CN) .......................... 201910856812.9

(51) Int. Cl.
*G06F 13/10* (2006.01)
*G06F 21/60* (2013.01)

(52) U.S. Cl.
CPC .......... *G06F 13/102* (2013.01); *G06F 21/604* (2013.01)

(58) Field of Classification Search
None
See application file for complete search history.

(56) References Cited

U.S. PATENT DOCUMENTS

| 2008/0137829 A1 | 6/2008 | Kaal et al. |
| 2009/0077280 A1 | 3/2009 | Anderson et al. |

(Continued)

FOREIGN PATENT DOCUMENTS

| CN | 101154200 | 4/2008 |
| CN | 101237686 | 8/2008 |

(Continued)

OTHER PUBLICATIONS

International Search Report, issued in the corresponding PCT Application No. PCT/CN2020/109311, dated Nov. 18, 2020, 6 pages.

(Continued)

*Primary Examiner* — Scott C Sun
(74) *Attorney, Agent, or Firm* — Hamre, Schumann, Mueller & Larson, P.C.

(57) ABSTRACT

Disclosed are a method, an apparatus for managing a peripheral device for an electronic device, an electronic device and a computer-readable medium. The electronic device includes a device management module and a routing module, the device management module includes a plurality of device node services for a plurality of peripheral devices. The method includes: receiving, by the routing module, first data from any one of the plurality of device node services, determining a first peripheral device for the first data of the peripheral device, and sending, by the routing module, the first data to the first peripheral device. Additionally, second data is received by the routing module from any one of the peripheral devices, a first device node service for the second data of the plurality of device node services is determined, and the second data is sent by the routing module to the first device node service.

20 Claims, 6 Drawing Sheets

(56) References Cited

U.S. PATENT DOCUMENTS

| | | | |
|---|---|---|---|
| 2010/0182848 A1 | 7/2010 | Hotta et al. | |
| 2011/0099301 A1 | 4/2011 | Moallem et al. | |
| 2012/0331187 A1 | 12/2012 | Xu et al. | |
| 2016/0092362 A1 | 3/2016 | Barron et al. | |
| 2021/0390118 A1* | 12/2021 | Gorkin | H04L 65/65 |

FOREIGN PATENT DOCUMENTS

| | | |
|---|---|---|
| CN | 101543010 | 9/2009 |
| CN | 104753709 | 7/2015 |
| CN | 105706068 | 6/2016 |
| CN | 110580240 | 12/2019 |

OTHER PUBLICATIONS

First Chinese Office Action, issued in the corresponding Chinese application No. 201910856812.9, dated Jul. 17, 2020, 19 pages.
Extended European Search Report, issued in the corresponding European patent application No. 20862090.6, dated Oct. 2, 2023, 8 pages.

* cited by examiner

METHOD, APPARATUS FOR MANAGING PERIPHERAL DEVICE FOR ELECTRONIC DEVICE, ELECTRONIC DEVICE AND MEDIUM

CROSS-REFERENCE TO RELATED APPLICATION

This application is a Section 371 National Stage Application of International Application No. PCT/CN2020/109311, filed on Aug. 14, 2020, entitled "METHOD, APPRATUS FOR MANAGING PERIPHERAL DEVICE FOR ELECTRONIC DEVICE, ELECTRONIC DEVICE AND MEDIUM," which claims priority to Chinese Application No. 201910856812.9, filed on Sep. 10, 2019, incorporated herein by reference in their entirety.

TECHNICAL FIELD

The present disclosure relates to a field of computer technology, and in particular, to a method and an apparatus for managing a peripheral device for an electronic device, an electronic device and a computer readable storage medium.

BACKGROUND

At present, there are a plurality of types of peripheral devices which may be connected to electronic devices for expansion or achievement of a plurality of types of functions. There are many ways to communicate between the peripheral devices and the electronic devices, such as serial ports, CAN (Controller Area Network) bus and other communication methods, and different peripheral devices have different hardware characteristics. When an application in an electronic device manages each peripheral device, it is required for application developer to understand hardware characteristics and interface modes of each peripheral device in detail in order to carry out corresponding application developments. This process is costly and time-consuming to learn.

SUMMARY

In view of this, a method, an apparatus for managing a peripheral device for an electronic device, an electronic device and a computer-readable medium are provided.

In one aspect, a method for managing a peripheral device for an electronic device is provided, wherein the electronic device includes a device management module and a routing module, the device management module includes a plurality of device node services for a plurality of peripheral devices, and the method includes at least one of a process of the electronic device writing data to the peripheral devices and a process of the electronic device reading data from the peripheral devices: in the process of the electronic device writing data to the peripheral devices: receiving, by the routing module, first data from any device node service of the plurality of device node services, and determining a first peripheral device for the first data of the plurality of peripheral device; and sending, by the routing module, the first data to the first peripheral device, so that the first peripheral device operates based on the first data. Alternatively or additionally, in the process of the electronic device reading data from the peripheral devices: receiving, by the routing module, second data from any peripheral device of the plurality of peripheral devices, and determining a first device node service for the second data of the plurality of device node services; and sending, by the routing module, the second data to the first device node service, so that the first device node service processes the second data.

According to the embodiments of the present disclosure, the method further including: sending, by the any device node service, the first data to the routing module through a device node channel for the any device node service. Wherein the receiving, by the routing module, first data from any device node service of the plurality of device node services includes: receiving, by the routing module, the first data from the device node channel.

According to the embodiments of the present disclosure, the device management module further includes a root node service; wherein before sending, by the any device node service, the first data to the routing module through a device node channel for the any device node service, the method further includes: receiving, by the any device node service, a first invocation request from a designated application for the any device node service, the first invocation request includes the first data. Alternatively, receiving, by the root node service, a second invocation request from a designate application, the second invocation request includes the first data, and the first data is allocated by the root node service to one or more device node services including the any device node service.

According to the embodiments of the present disclosure, the routing module includes a routing table, and the routing table includes a mapping relationship between the plurality of peripheral devices and the device node channel. Wherein the determining a first peripheral device for the first data of the plurality of peripheral devices includes: determining, by the routing module, the first peripheral device matching the device node channel transmitting the first data of the plurality of peripheral devices, based on the routing table.

According to the embodiments of the present disclosure, the plurality of peripheral devices are allocated to one or more embedded system boards; wherein the sending, by the routing module, the first data to the first peripheral device includes: sending, by the routing module, the first data to the embedded system board where the first peripheral device is located, and the first data includes identification information of the first peripheral device. Alternatively or additionally, wherein the receiving, by the routing module, second data from any peripheral device of the plurality of peripheral devices includes: receiving, by the routing module, the second data from the embedded system board where the any peripheral device is located, and the second data includes identification information of the any peripheral device.

According to the embodiments of the present disclosure, the routing module includes a routing table, and the routing table includes a mapping relationship between the plurality of peripheral devices and the device node channel. Wherein the determining a first device node service for the second data of the plurality of device node services includes: determining, by the routing module, a device node channel matching the identification information in the second data based on the routing table.

According to the embodiments of the present disclosure, the sending, by the routing module, the second data to the first device node service, so that the first device node service processes the second data includes: sending, by the routing module, the second data through the device node channel matching the identification information in the second data, so that the second data is received by the first device node service for the device node channel; and processing, by the first device node service, valid data in the second data, and sending a processing result to a designated application.

According to the embodiments of the present disclosure, the device management module further includes a root node service; wherein the sending a processing result to a designated application includes: sending, by the first device node service, the processing result to the root node service, and forwarding, by the root node service, the processing result to the designated application; or sending, by the first device node service, the processing result to the designated application.

According to the embodiments of the present disclosure, the method further includes: after the receiving, by the routing module, first data from any device node service of the plurality of device node services, verifying the first data by the routing module, and discarding the first data in response to a failure of the verification. Alternatively or additionally, after the sending, by the routing module, the second data to the first device node service, verifying the second data by the routing module, and discarding the second data in response to a failure of the verification.

In another aspect, an apparatus for managing a peripheral device for an electronic device is provided, including: a device management module and a routing module, wherein the device management module includes a plurality of device node services for a plurality of peripheral devices, and the device includes at least one of a process of the electronic device writing data to the peripheral devices and a process of the electronic device reading data from the peripheral devices: wherein in the process of the electronic device writing data to the peripheral devices: the device management module is configured to send first data to the routing module based on any device node service of the plurality of device node services; and the routing module is configured to receive the first data from the any device node service, determine a first peripheral device for the first data of the plurality of peripheral device, and send the first data to the first peripheral device, so that the first peripheral device operates based on the first data. Alternatively or additionally, wherein in the process of the electronic device reading data from the peripheral devices: the routing module is configured to receive second data from any peripheral device of the plurality of peripheral devices, determine a first device node service for the second data of the plurality of device node services; and send the second data to the first device node service, so that the first device node service processes the second data.

In another aspect, an electronic device is provided, including a memory, a processor and a computer program stored in the memory and executable in the processor, wherein the method described above is implemented in response to the processor executing the program.

In another aspect, a computer-readable storage medium is provided, an executable instruction is stored on the computer-readable storage medium, the method described above is performed by the processor in response to the processor executing the instruction.

BRIEF DESCRIPTION OF THE DRAWINGS

Through the following description of the embodiments of the present disclosure with reference to the accompanying drawings, the above and other objectives, features, and advantages of the present disclosure will become more apparent. In the accompanying drawings.

DETAILED DESCRIPTION OF EMBODIMENTS

Figure 1:
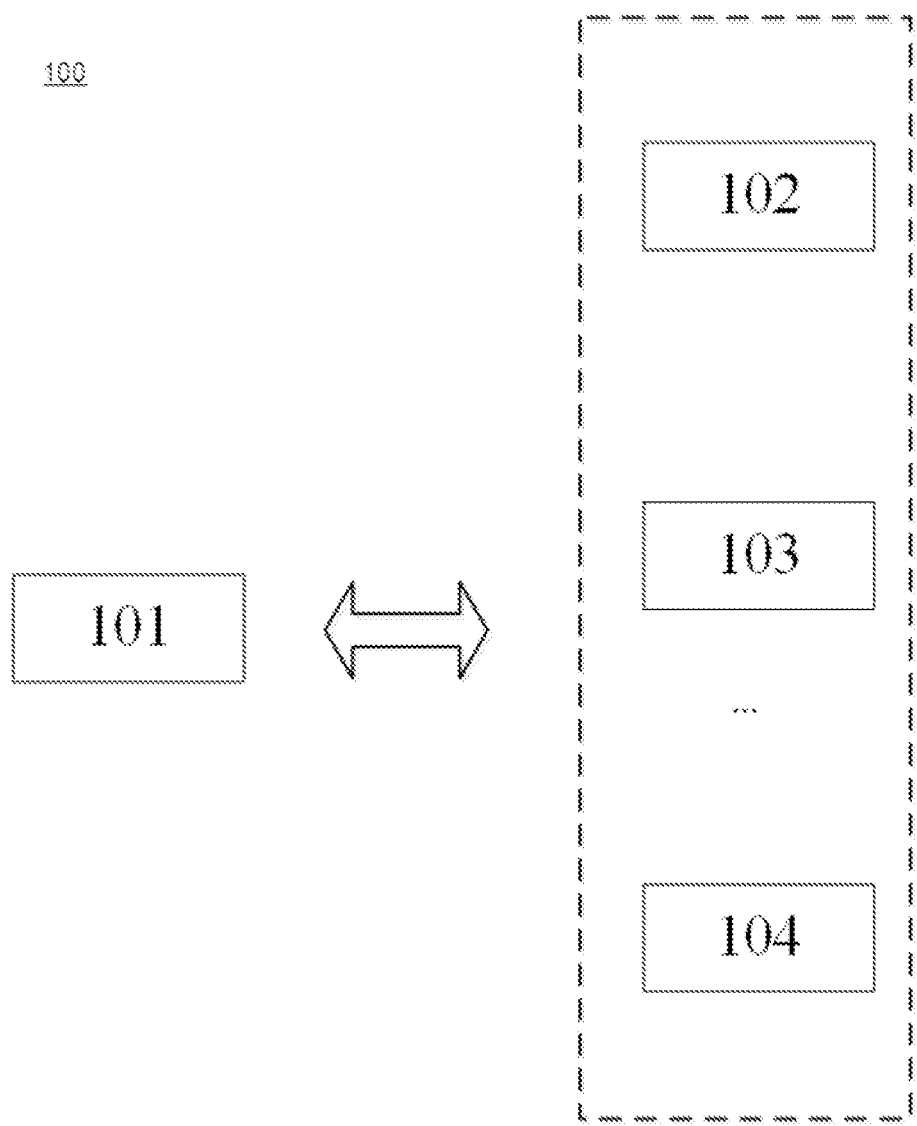
FIG. 1 schematically shows an exemplary system architecture to which a method and an apparatus for managing a peripheral device are applied according to the embodiments of the present disclosure.

Hereinafter, the embodiments of the present disclosure will be described with reference to the drawings. However, it should be understood that these descriptions are only exemplary, and are not intended to limit the scope of the present disclosure. In the following detailed description, for ease of explanation, many specific details are set forth to provide a comprehensive understanding of the embodiments of the present disclosure. However, it is obvious that one or more embodiments may also be implemented without these specific details. In addition, in the following description, descriptions of well-known structures and technologies are omitted to avoid unnecessarily obscuring the concept of the present disclosure.

The terms used here are only for describing specific embodiments, and are not intended to limit the present disclosure. The terms "including", "comprising", etc. used herein indicate the presence of the described features, steps, operations, and/or components, but do not exclude the presence or addition of one or more other features, steps, operations, or components.

All the terms (including technical and scientific terms) used herein have the meanings commonly understood by those skilled in the art, unless otherwise defined. It should be noted that the terms used herein should be interpreted as having meanings consistent with the context of this specification, and should not be interpreted in an idealized or overly rigid manner.

In the case of using an expression similar to "at least one of A, B and C, etc.", generally speaking, it should be interpreted according to the meaning of the expression commonly understood by those skilled in the art (for example, "a system having at least one of A, B and C" shall include, but is not limited to, systems having A alone, B alone, C alone, A and B, A and C, B and C, and/or systems having A, B, C, etc.). In the case of using an expression similar to "at least one of A, B or C, etc.", generally speaking, it should be interpreted according to the meaning of the expression commonly understood by those skilled in the art (for example, "a system having at least one A, B or C, etc." shall include, but is not limited to, systems having A alone, B alone, C alone, A and B, A and C, B and C, and/or systems having A, B, C, etc.).

The embodiments of the present disclosure provide a method and an apparatus for managing a peripheral device for an electronic device. The electronic device includes a device management module and a routing module, and the device management module includes a plurality of device node services for a plurality of peripheral devices. The method includes a data writing stage and a data reading stage. In the data writing stage, the electronic device gives a control instruction to the peripheral devices. A routing module receives first data from any one of the plurality of device node services, and a first peripheral device for the first data of the plurality of peripheral devices is determined, and then the first data is sent to the first peripheral device through the routing module, so that the first peripheral device may operate based on the first data. Alternatively or additionally, in the data reading phase, the electronic device obtains data from the peripheral devices. The routing module receives second data from any one of the plurality of peripheral devices, and a first device node service for the second data of the plurality of device node services is determined, and then the second data is sent to the first device node service through the routing module, so that the first device node service may process the second data.

FIG. 1 schematically shows an exemplary system architecture 100 to which a method and an apparatus for managing a peripheral device for an electronic device may be applied according to the embodiments of the present disclosure. It should be noted that FIG. 1 is only an example of the system architecture to which the embodiments of the present disclosure may be applied to help those skilled in the art understand the technical content of the present disclosure, but it does not mean that the embodiments of the present disclosure may not be used in other devices, systems, environments or scenarios.

As shown in FIG. 1, the system architecture 100 according to this embodiment may include an electronic device 101 and peripheral devices 102, 103, and 104. The electronic device 101 and any one of the peripheral devices 102, 103, and 104 may be communicated through various wired or wireless communication links.

The electronic device 101 may be various electronic devices that have certain computing capabilities, may provide one or more functions, and may use one or more peripheral devices, including but not limited to robots, smart phones, laptop computers, and desktop computers, etc.

The peripheral devices 102, 103, and 104 may operate independently or semi-independently without relying on the electronic device 101, and generally may expand or improve functions or performance of the connected electronic device 101. The peripheral devices may include input and output devices, partial storage devices, various types of sensors, such as keyboards, mice, scanners, cameras, monitors, printers, optical disc drives, various sensors, etc., which are not limited here.

The electronic device 101 may send data to the peripheral devices 102, 103, and 104 to instruct the peripheral devices 102, 103, and 104 to perform various operations. For example, a robot may send data to a camera to make the camera perform a shooting operation. The electronic device 101 may also obtain data from the peripheral devices 102, 103, 104 for analysis and processing. For example, a robot may obtain an image from a camera to analyze whether there is an obstacle on the travelling path. The above examples are only illustrative and do not limit the present disclosure.

It should be noted that the method for managing a peripheral device for an electronic device according to the embodiments of the present disclosure may be executed by the electronic device 101. Correspondingly, the apparatus for managing the peripheral device for the electronic device according to the embodiments of the present disclosure may be provided in the electronic device 101.

It should be understood that numbers and types of the electronic device and the peripheral devices in FIG. 1 are merely illustrative. According to implementation requirements, there may be any number and any type of electronic devices and peripheral devices.

Figure 2:
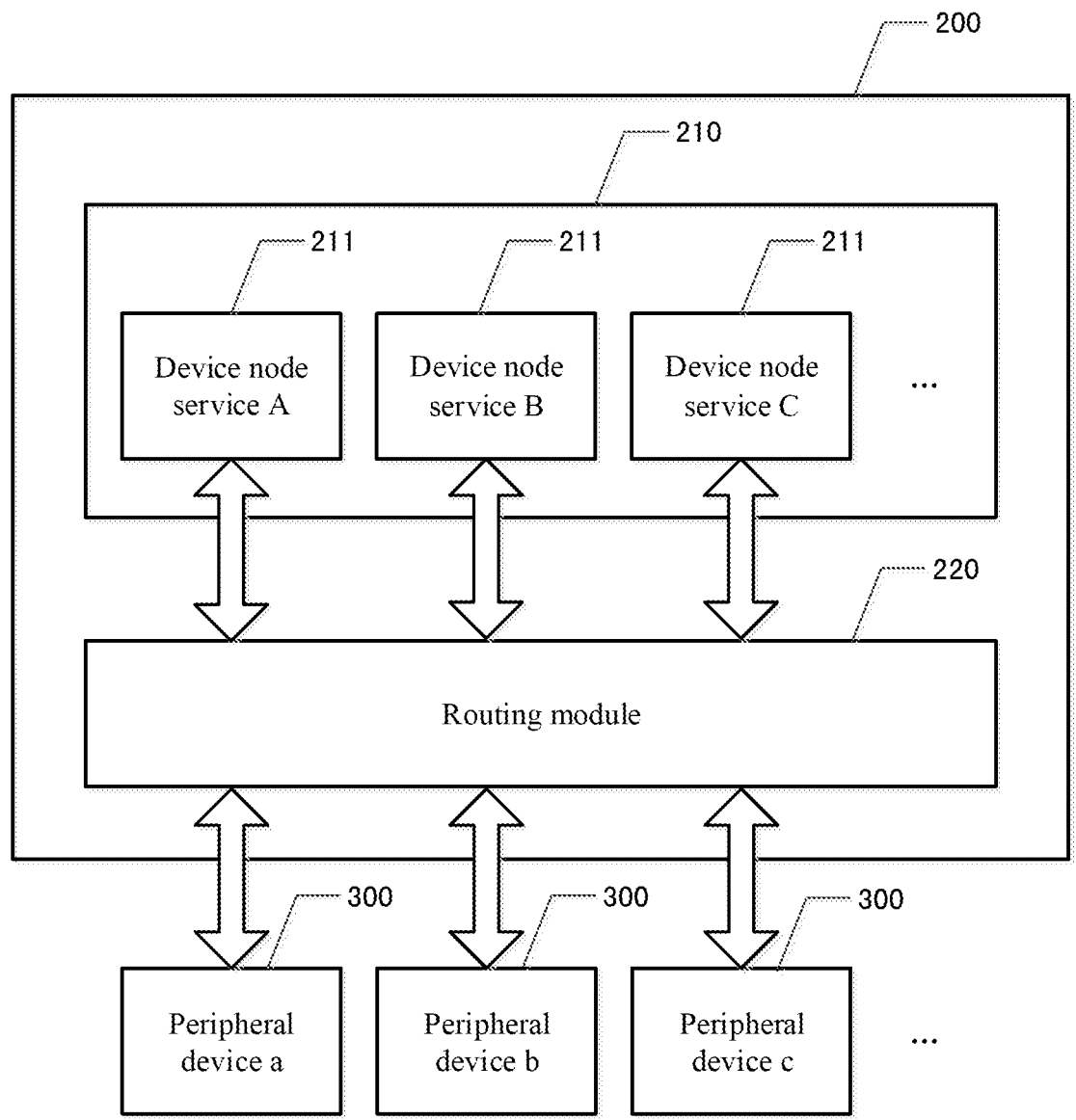
FIG. 2 schematically shows an exemplary block diagram of an electronic device according to the embodiments of the present disclosure.

FIG. 2 schematically shows an exemplary block diagram of an electronic device according to the embodiments of the present disclosure.

As shown in FIG. 2, the electronic device 200 includes a device management module 210 and a routing module 220, and the device management module 210 includes a plurality of device node services 211 for a plurality of peripheral devices 300.

Exemplarily, the device management module 210 may include N device node services 211 (device node service A, device node service B, device node service C, . . . ), which are used to manage N peripheral devices 300 (peripheral device a, peripheral device b, peripheral device c . . . ), where N is a positive integer, and the N peripheral devices may be the same or different peripheral devices. Assuming that a device node service for the peripheral device a is the device node service A, the device node service A may be a device management driver of the peripheral device a essentially and may implement various customized functions based on characteristics of the peripheral device a. In the embodiments of the present disclosure, the device node service A may be encapsulated as a service that may be directly invoked by an application program in the electronic device 200. When the application program invokes the device node service A, there is no need to know a specific implementation of the corresponding peripheral device a in detail. Working principles of other device node services are the same as that of the device node service A, which will not be repeated here.

The method for managing a peripheral device for an electronic device according to the embodiments of the present disclosure may achieve a management of the plurality of peripheral devices 300 by the electronic device 200. A process of managing the plurality of peripheral devices 300 by the electronic device 200 will be described below with reference to FIG. 3.

Figure 3A:
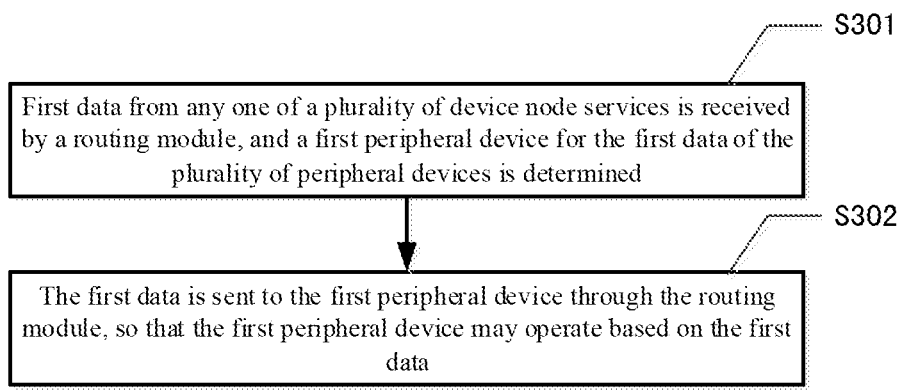
FIGS. 3A to 3B schematically show a flowchart of a method for managing a peripheral device for an electronic device according to the embodiments of the present disclosure, respectively.
Figure 3B:
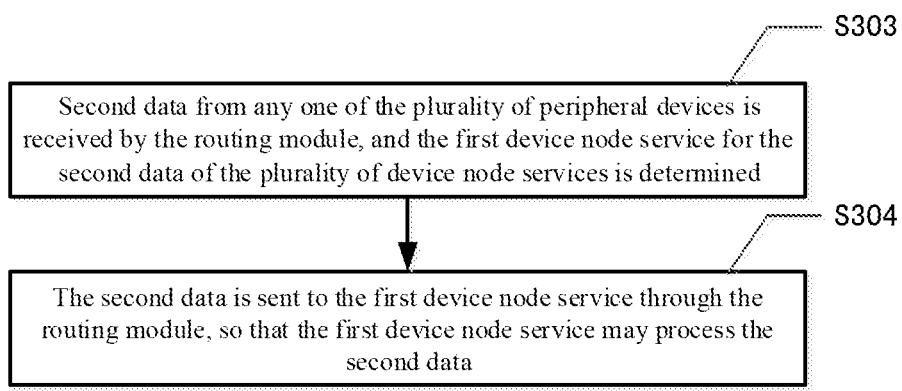

FIGS. 3A and 3B schematically show a flowchart of a method for managing a peripheral device for an electronic device according to the embodiments of the present disclosure, respectively.

As shown in FIG. 3A, the method for managing the peripheral device for the electronic device may include a process in which the electronic device writes data to the peripheral device, and the process may include operations S301 to S302.

In operation S301, first data from any one of a plurality of device node services is received by a routing module, and a first peripheral device for the first data of the plurality of peripheral devices is determined.

The first peripheral device may be any peripheral device of the plurality of peripheral devices, which is not limited here.

Next, in operation S302, the first data is sent to the first peripheral device through the routing module, so that the first peripheral device may operate based on the first data.

The above operations S301 to S302 will be described with the electronic device 200 shown in FIG. 2. The first data from any device node service 211 of the N device node services 211 is received by the routing module 220, and then the routing module 220 may determine the peripheral device (such as the peripheral device b) for the first data of the N peripheral devices 300. After that, the first data is sent to the peripheral device b through the routing module 220, so that the peripheral device b may operate based on the first data.

As shown in FIG. 3B, the method for managing the peripheral device for the electronic device may include a process in which the electronic device reads data from the peripheral device, and the process may include operations S303 to S304.

In operation S303, second data from any one of the plurality of peripheral devices is received by the routing module, and the first device node service for the second data of the plurality of device node services is determined.

The first device node service may be any device node service of the plurality of device node services, which is not limited here.

Next, in operation S304, the second data is sent to the first device node service through the routing module, so that the first device node service may process the second data.

The above operations S303 to S304 will be described with the electronic device 200 shown in FIG. 2. The second data from any one of the N peripheral devices 300 is received by the routing module 220, and then the routing module 220 may determine the device node service (for example, the device node service C) for the second data of the N device node services 211. After that, the second data is sent to the device node service C through the routing module 220, so that the device node service C may process the second data.

Those skilled in the art may understand that in the solution of managing the peripheral device for the electronic device according to the embodiments of the present disclosure, the electronic device includes a device management module and a routing module, the device management module may uniformly manage the plurality of device node services for the plurality of peripheral devices. The device node services may be directly invoked by the application in the electronic device. The routing module may communicate the plurality of device node services with the plurality of peripheral devices, and may achieve the process of the device node services writing data to any peripheral device, as long as the process of the device node services reading data from any peripheral device. Thus, a unified management of one or more peripheral devices of the electronic device with high expandability and flexibility may be achieved. Moreover, since each device node service is encapsulated as a service that may be invoked directly, the developer of the application program of the electronic device may achieve a simple and quick development of the application program without understanding the specific implementation of the underlying peripheral device.

In the embodiments of the present disclosure, the plurality of peripheral devices may be allocated to one or more embedded system boards. The above mentioned "the first data is sent to the first peripheral device through the routing module" includes: the first data is sent to an embedded system board where the first peripheral device is located through the routing module, and the first data may include identification information of the first peripheral device. Alternatively or additionally, the above mentioned "the second data from any one of the plurality of peripheral devices is received by the routing module" includes: the second data from an embedded system board where any one of the peripheral devices is located is received by the routing module, the second data may include identification information of any one of the peripheral devices.

Figure 4:
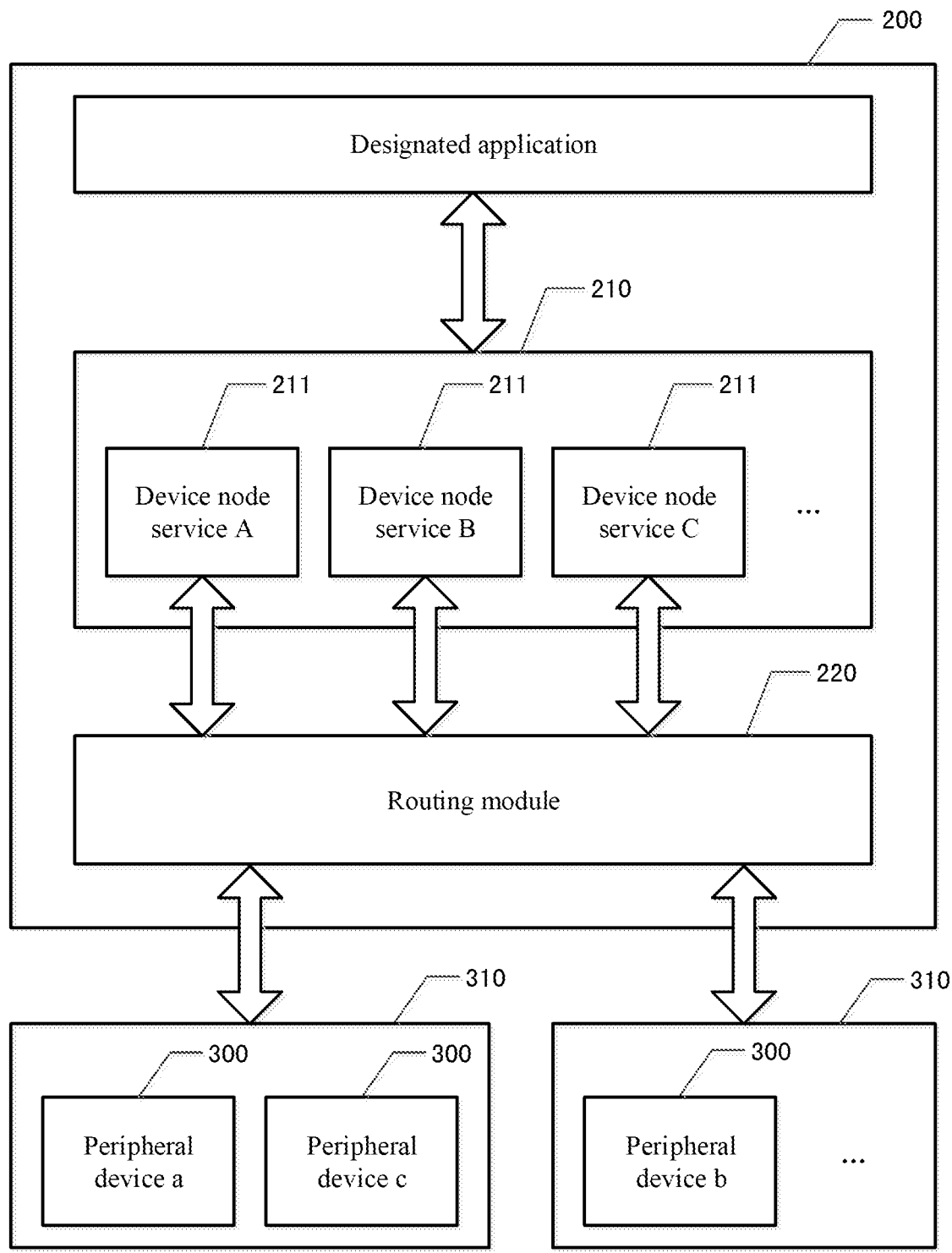
FIG. 4 schematically shows an exemplary block diagram of an electronic device according to another embodiment of the present disclosure.

FIG. 4 schematically shows an exemplary block diagram of an electronic device according to another embodiment of the present disclosure.

As shown in FIG. 4, the electronic device 200 includes a device management module 210 and a routing module 220, the device management module 210 includes N device node services 211 for N peripheral devices 300. The N peripheral devices 300 may be allocated to one or more embedded system boards 310 according to functions thereof. For example, peripheral device a and peripheral device c are integrated into an ultrasound acquisition board, and peripheral device b, peripheral device d and peripheral device e are integrated into a light control board, etc., which are not limited here. Each embedded system board 310 may uniformly use a same communication link to interact with the electronic device 200. For example, each embedded system board 310 may uniformly use a CAN bus to communicate with the routing module 220. Based on the characteristics of the CAN bus, all the peripheral devices 300 may be easily and quickly connected to a core processor of the electronic device 200. In this case, even if the communication interfaces of the plurality of peripheral devices 300 are different, the electronic device 200 may only need to configure one unified interface to achieve a management and control of the plurality of peripheral devices 300.

In the embodiments of the present disclosure, the device management module and the routing module may communicate through a plurality of device node channels for the plurality of device nodes. The routing module may include a routing table, and the routing table may include a mapping relationship between the plurality of peripheral devices and the plurality of device node channels. The process of the electronic device writing data to the peripheral devices and the process of the electronic device reading data from the peripheral devices will be further described below.

(1) Regarding the process of the electronic device writing data to the peripheral devices, before the above mentioned "first data from any one of a plurality of device node services is received by a routing module", the method for managing the peripheral device for the electronic device according to the embodiments of the present disclosure may further include: the first data is sent to the routing module by the any device node service through a device node channel for the any device node service. On this basis, the foregoing process of "first data from any one of a plurality of device node services is received by a routing module" may be: the first data from the device node channel is received by the routing module.

Further, after the first data from the device node channel is received by the routing module, the foregoing process of "a first peripheral device for the first data of the plurality of peripheral devices is determined" may be: the first peripheral device of the plurality of peripheral devices matching the device node channel transmitting the first data may be determined by the routing module based on the routing table.

For example, for the electronic device 200 shown in FIG. 4, when it is required for the data to be written to the peripheral devices, any device node service 211 (such as device node service B) in the device management module 210 may send the first data to the routing module 220 through the device node channel (such as a second device node channel) for the device node service B. The routing module 220 receives the first data from the second device node channel, and the routing module 220 may determine a peripheral device 300 (such as peripheral device b) matching the second device node channel transmitting the first data based on the stored routing table. After that, the routing module 220 may send the first data to the embedded system board 310 where the peripheral device b is located through the CAN bus, and the embedded system board 310 may allocate the first data to the peripheral device b based on identification information of the peripheral device b carried in the first data.

(2) For the process of the above electronic device reading data from the peripheral devices, after the second data from any peripheral device is received by the routing module, the process of the routing module determining the first device node service for the second data of the plurality of device node services may be: the device node channel matching the identification information in the second data is determined by the routing module based on the routing table.

Further, the process of "the second data is sent to the first device node service through the routing module, so that the first device node service may process the second data" may be: the second data is sent by the routing module through the device node channel matching the identification information in the second data, so that the second data is received by the first device node service for the device node channel. After that, the first device node service may process valid data in the second data, and send a processing result to a designated application.

For example, for the electronic device 200 shown in FIG. 4, when the data is obtained from the peripheral devices, any peripheral device 300 (such as peripheral device a) is integrated into an embedded system board 310 (such as a light control board), and the light control board may send the second data from the peripheral device a to the routing module 220 in the electronic device 200 through the CAN bus. The routing module 220 may receive the second data carrying identification information of the peripheral device a, and the routing module 220 may determine the first device node channel matching the identification information of the peripheral device a based on the stored routing table. After that, the routing module 220 may write the second data to the first device node channel. Since the first device node channel is directly connected to a device node service (such as device node service A), the device node service A may read the second data from the first device node channel, thereby processing the second data and sending a processing result to the designated application.

Exemplarily, the device management module 210 may be a device management process, and the routing module 220 may be a routing process. A communication mechanism between the device management module 210 and the routing module 220 is an inter-process communication. Therefore, the above mentioned device node channel may be, for example, a FIFO (First Input First Output) pipe or other unnamed pipes. The first data and the second data may have a certain data packet format, such as the data packet format of the first data and the second data is shown in Table 1:

TABLE 1

| Data Head | Data Length Indicator | Valid Data | Check Digit |
|---|---|---|---|
| 2 bits | 2 bits | x bits | 1 bit |

In this example, the data packet format may include a data header, a data length indicator, valid data, and a check digit. The identification information of the peripheral device may be recorded in the data header, which occupies a data length of 2 bits. The data length indicator may record a data length occupied by valid data, and the data length indicator may occupy the data length of 2 bits. The valid data may record the data to be actually read or written, which occupies a data length of x bits, x needs to be known by reading the data length indicator, and x is a positive integer. Finally, there is a check digit of 1 bit, which may be used to check a correctness of the data packet. Among them, a division of a structure of the data packet, an order of each part, the data length occupied by each part, etc. may all be provided as required, and it is only illustrated by way of example here. The identification information of the peripheral device may uniquely identify the peripheral device, and attribute information of the peripheral device may be combined or a single attribute information may be used as needed, to obtain corresponding identification information. For example, the attribute information of the peripheral device may include: device name (name), unique device number (UID), device type (Device_Type), device number (Device_Id), etc., and "device type+device number" may be used as the identification information of the peripheral device.

For the data packet of the first data or the second data as shown in Table 1, when the data packet is analyzed, the identification information of the peripheral device may be determined first, and then the data length indicator used to indicate the data length of the valid data may be obtained, after that, the complete valid data and the check digit may be read, and verification may be performed on the data packet based on the check digit.

Exemplarily, in the embodiments of the present disclosure, the method for managing the peripheral device for the electronic device according to the embodiments of the present disclosure may further include: in one case, after the first data of any device node service of the plurality of device node services is received by the routing module, the routing module may verify the first data based on the check bit of the first data. If the verification fails, the first data is discarded, and the subsequent process of writing the first data to the peripheral device is no longer executed. In another case, after the second data is sent to the first device node service by the routing module, the first device node service may verify the second data based on the check digit of the second data. If the verification fails, the second data is discarded, and the subsequent process of processing the second data is no longer executed.

According to the embodiments of the present disclosure, the device management module in the electronic device may further include a root node service, a plurality of device node services are registered to the root node service, and the root node service may directly manage each device node service.

Exemplarily, when a designated application in an electronic device needs to write first data to a peripheral device, the designated application may directly invoke a corresponding device node service, so that the device node service may obtain the first data. Alternatively, the designated application may also invoke a root node service, and the root node service may allocate the first data to the corresponding device node service after obtaining the first data. Among them, the designated application may determine an invocation method according to whether an attribute of the invoke request is for a single peripheral device or shared by a plurality of peripheral devices. For example, when the attribute in the invocation request is a common attribute, the designated application may invoke the root node service; when the attribute in the invocation request is an exclusive attribute, the designated application may directly invoke the device node service with the exclusive attribute. That is to say, before the first data is sent to the routing device by any device node service through a device node channel for the device node service, the method for managing the peripheral device for the electronic device according to the embodiments of the present disclosure may also include any one of the following (1)~(2): (1) a first invocation request of the designated application for any device node service is received by the any device node service, and the first invocation request may include the first data. (2) a second invocation request of the designated application is received by the root node service, the second invocation request may include the first data, and the first data is allocated by the root node service to one or more device node services including the any device node service.

Correspondingly, second data is received by any device node service and the second data is processed, after a processing result is obtained, the processing result may be directly sent to the designated application, or the processing result may be forwarded to the root node service, which may be selected according to actual requirements, and it is no limited here.

Figure 5:
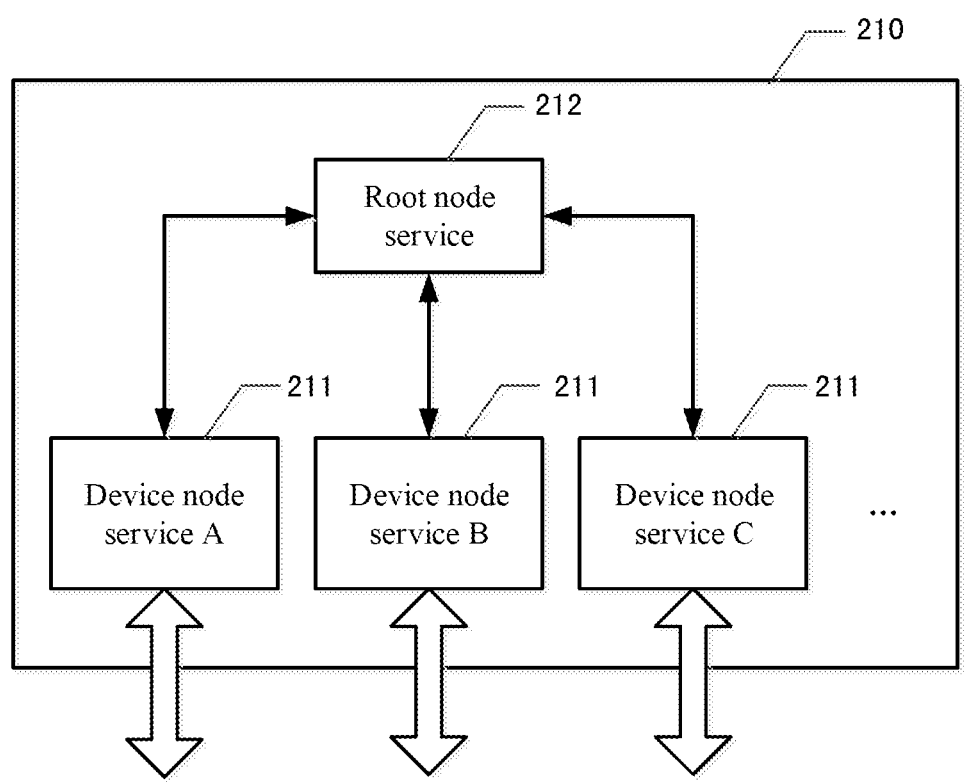
FIG. 5 schematically shows an exemplary block diagram of a device management module 210 in FIG. 2 and FIG. 4 according to the embodiments of the present disclosure.

FIG. 5 schematically shows an exemplary block diagram of the device management module 210 in FIG. 2 and FIG. 4 according to the embodiments of the present disclosure.

As shown in FIG. 5, the device management module 210 includes three device node services 211, such as device node service A, device node service B, and device node service C, corresponding to peripheral device a, peripheral device b, and peripheral device c, respectively. The device management module 210 also includes a root node service 212, such as a root node service Device_Context. In this example, the device management module 210 may open a device management interface to the outside, and the device management interface corresponds to the root node service 212. The designated application in the electronic device 200 may use a UID parameter of the peripheral device to invoke the device management interface. In response to the invocation, the Device_Context obtains each attribute of the peripheral device for the UID parameter, so as to obtain the above-mentioned Device_Type and Device_ID, combining the two as identification information of the peripheral device, and sending the identification information to the corresponding device node service 211 (such as the device node service B and the device node service C), the device node service B and the device node service C respectively write instructions to be sent (that is, the first data) into their corresponding device node channels (such as a second FIFO pipe and a third FIFO pipe) according to specified rules. The routing module 220 reads data from the device node channel, and then assembles the data into a data packet as shown in Table 1 and sends the data packet to the CAN bus, which is received by an embedded system board 310 where the peripheral device b and the peripheral device c are located. In addition, when the embedded system board 310 sends the second data from the peripheral device 300 through the CAN bus, the routing module 220 reads data of the CAN bus, and the routing module sends the second data to the device node channel (such as a first FIFO pipe) matching the identification information in the second data based on the routing table. The device node service A reads the first FIFO pipe data, then performs corresponding processing according to own attributes of the peripheral device a, and sends the processing result to the Device_Context. The Device_Context then sends the processing result to the designated application.

According to the embodiments of the present disclosure, there is also provided an apparatus for managing a peripheral device for an electronic device, including: a device management module and a routing module. The device management module includes a plurality of device node services for a plurality of peripheral devices. In one case, the device management module is used to send first data to the routing module based on any one of the plurality of device node services. The routing module is used to receive the first data from the device node service, determine a first peripheral device for the first data of the plurality of peripheral devices, and then send the first data to the first peripheral device, so that the first peripheral device operates based on the first data. Alternatively or additionally, in another case, the routing module is used to receive second data from any one of the plurality of peripheral devices, determine a first device node service for the second data of the plurality of device node services, and then send the second data to the first device node service, so that the first device node service processes the second data.

It should be noted that an implementation, a technical problem solved, a function achieved and a technical effect reached of each module/unit/sub-unit, etc., in the embodiments of the device are respectively the same or the like as an implementation, a technical problem solved, a function achieved and a technical effect reached of each corresponding step in the embodiments of the method, and will not be repeated here.

According to the embodiments of the present disclosure, any number of the modules, sub-modules, units, and sub-units, or at least part of the functions of any number thereof, may be implemented in one module. Any one or more of the modules, sub-modules, units, and sub-units according to the embodiments of the present disclosure may be split into a plurality of modules for implementation. Any one or more of the modules, sub-modules, units, and sub-units according to the embodiments of the present disclosure may be at least partially implemented as a hardware circuit, such as a field programmable gate array (FPGA), a programmable logic array (PLA), a system-on-chip, a system-on-substrate, a system-on-package, an application-specific integrated circuit (ASIC), or hardware or firmware in any other reasonable way that integrates or encapsulates the circuit, or may be implemented by any one of software, hardware, and firmware, or an appropriate combination thereof. Alternatively, one or more of the modules, sub-modules, units, and sub-units according to the embodiments of the present disclosure may be at least partially implemented as a computer program module, and when the computer program module is executed, a corresponding function may be performed.

Figure 6:
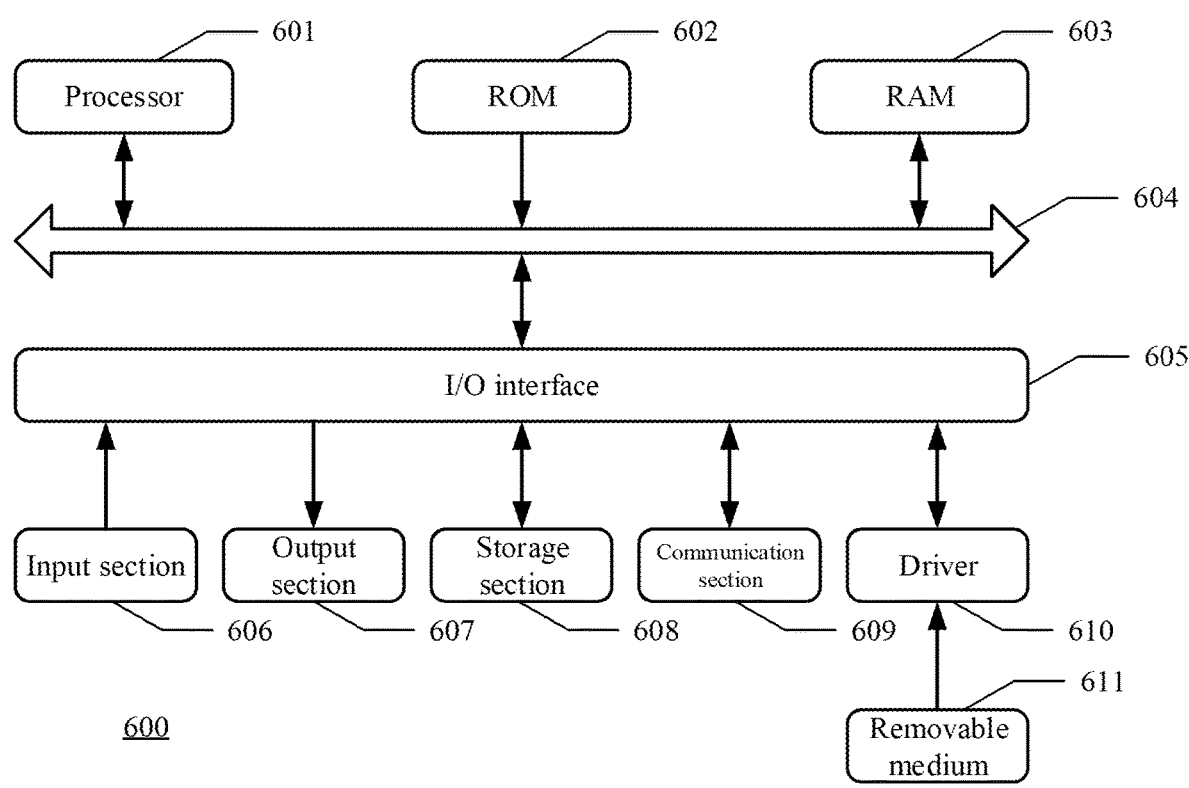
FIG. 6 schematically shows a block diagram of an electronic device according to the embodiments of the present disclosure.

FIG. 6 schematically shows a block diagram of an electronic device suitable for implementing the above-described method according to the embodiments of the present disclosure. The electronic device shown in FIG. 6 is only an example, and should not limit a function and a scope of use of the embodiments of the present disclosure.

As shown in FIG. 6, an electronic device 600 according to the embodiment of the present disclosure includes a processor 601, which may perform various appropriate actions and processing according to programs stored in a read only memory (ROM) 602 or programs loaded from a storage section 608 to a random access memory (RAM) 603. The processor 601 may include, for example, a general-purpose microprocessor (for example, a CPU), an instruction set processor and/or a related chipset and/or a special-purpose microprocessor (for example, an application specific integrated circuit (ASIC)), and so on. The processor 601 may also include an on-board memory for caching purpose. The processor 601 may include a single processing unit or a plurality of processing units for executing different actions of a method flow according to the embodiments of the present disclosure.

In the RAM 603, various programs and data required for the operation of the device 600 are stored. The processor 601, the ROM 602, and the RAM 603 are connected to each other through a bus 604. The processor 601 executes various operations of the method flow according to the embodiments of the present disclosure by executing programs in the ROM 602 and/or RAM 603. It should be noted that the programs may also be stored in one or more memories other than the ROM 602 and the RAM 603. The processor 601 may also execute various operations of the method flow according to the embodiments of the present disclosure by executing programs stored in the one or more memories.

According to the embodiments of the present disclosure, the device 600 may further include an input/output (I/O) interface 605, and the input/output (I/O) interface 605 is also connected to the bus 604. The device 600 may also include one or more of the following components connected to the I/O interface 605: an input section 606 including a keyboard, a mouse, etc.; an output section 607 including a cathode ray tube (CRT), a liquid crystal display (LCD), and a speaker etc., a storage section 608 including a hard disk and the like; and a communication section 609 including a network interface card such as a LAN card, a modem, and the like. The communication section 609 performs communication processing via network such as the Internet. A driver 610 may also be connected to the I/O interface 605 as required. A removable medium 611, such as a magnetic disk, an optical disk, a magneto-optical disk, a semiconductor memory, etc., may be installed on the driver 610 as required, so that computer programs read therefrom may be installed into the storage section 608 as required.

According to the embodiments of the present disclosure, the method flow according to the embodiments of the present disclosure may be implemented as a computer software program. For example, the embodiments of the present disclosure includes a computer program product, which includes a computer program carried on a computer-readable storage medium, and the computer program contains program codes for executing a method shown in the flowchart. In such an embodiment, the computer program may be downloaded and installed from the network through the communication section 609, and/or installed from the removable medium 611. When the computer program is executed by the processor 601, the above-mentioned functions defined in the system of the embodiments of the present disclosure are executed. According to the embodiments of the present disclosure, the systems, devices, apparatuses, modules, units, etc. described above may be implemented by a computer program module.

The present disclosure also provides a computer-readable storage medium. The computer-readable storage medium may be included in the device/apparatus/system described in the above embodiments; or may exist alone without being assembled into the device/apparatus/system. The above mentioned computer-readable storage medium carries one or more programs, and when the above mentioned one or more programs are executed, the method according to the embodiments of the present disclosure is implemented.

According to the embodiments of the present disclosure, the computer-readable storage medium may be a non-volatile computer-readable storage medium, for example, may include but not limited to: a portable computer disk, a hard disk, a random access memory (RAM), a read-only memory (ROM) , a erasable programmable read-only memory (EPROM or flash memory), a portable compact disk read-only memory (CD-ROM), a optical storage device, a magnetic storage device, or any suitable combination thereof In the present disclosure, the computer-readable storage medium may be any tangible medium that contains or stores a program, and the program may be used by or in combination with an instruction execution system, apparatus, or device. For example, according to the embodiments of the present disclosure, the computer-readable storage medium may include the ROM 602 and/or RAM 603 described above, and/or one or more memories other than ROM 602 and RAM 603.

The flowcharts and block diagrams in the accompanying drawings illustrate the architectures, functions, and operations that may be implemented by the system, method, and computer program product according to the embodiments of the present disclosure. In this regard, each block in the flowchart or block diagram may represent a part of a module, a program segment, or a code, and the above-mentioned part of the module, the program segment, or the code contains one or more executable instructions for achieving specified logic functions. It should also be noted that, in some alternative implementations, the functions marked in the block may also occur in a different order from the order marked in the drawings. For example, two blocks shown one after the other may actually be executed substantially in parallel, or they may sometimes be executed in a reverse order, depending on the functions involved. It should also be noted that each block in the block diagram or flowchart, and a combination of blocks in the block diagram or flowchart, may be implemented by a dedicated hardware-based system that performs specified functions or operations, or may be implemented by a combination of dedicated hardware and computer instructions.

The embodiments of the present disclosure have been described above. However, these embodiments are for illustrative purposes only, and are not intended to limit the scope of the present disclosure. Although each embodiment has been described above, this does not mean that measures in each embodiment may not be advantageously used in combination. The scope of the present disclosure is defined by the appended claims and their equivalents. Without departing from the scope of the present disclosure, those skilled in the art may make various substitution and modification, and these substitution and modification should all fall within the scope of the present disclosure.

What is claimed is:

1. A method for managing a peripheral device for an electronic device, wherein the electronic device comprises a device management module and a routing module, the device management module comprises a plurality of device node services for a plurality of peripheral devices, the method comprising:
at least one of a process of the electronic device writing data to the peripheral devices and a process of the electronic device reading data from the peripheral devices,
wherein the process of the electronic device writing data to the peripheral devices comprises:
receiving, by the routing module, first data from any device node service of the plurality of device node services, and determining a first peripheral device for the first data of the plurality of peripheral device; and
sending, by the routing module, the first data to the first peripheral device, so that the first peripheral device operates based on the first data; and
wherein the process of the electronic device reading data from the peripheral devices comprises:
receiving, by the routing module, second data from any peripheral device of the plurality of peripheral devices, and determining a first device node service for the second data of the plurality of device node services; and sending, by the routing module, the second data to the first device node service, so that the first device node service processes the second data; and sending, by the any device node service, the first data to the routing module through a device node channel for the any device node service, wherein the receiving, by the routing module, first data from any device node service of the plurality of device node services comprises:

receiving, by the routing module, the first data from the device node channel, wherein the device management module further comprises a root node service, wherein before sending, by the any device node service, the first data to the routing module through a device node channel for the any device node service, the method further comprises:

receiving, by the any device node service, a first invocation request from a designated application for the any device node service, the first invocation request comprises the first data; or receiving, by the root node service, a second invocation request from a designated application, the second invocation request comprises the first data, and the first data is allocated by the root node service to one or more device node services comprising the any device node service.

2. The method according to claim 1, wherein the routing module comprises a routing table, and the routing table comprises a mapping relationship between the plurality of peripheral devices and the device node channel; and wherein the determining a first peripheral device for the first data of the plurality of peripheral devices comprises:

determining, by the routing module, the first peripheral device matching the device node channel transmitting the first data of the plurality of peripheral devices, based on the routing table.

3. The method according to claim 1, wherein the plurality of peripheral devices are allocated to one or more embedded system boards;

wherein the sending, by the routing module, the first data to the first peripheral device comprises:

sending, by the routing module, the first data to the embedded system board where the first peripheral device is located, and the first data comprises identification information of the first peripheral device; and/or wherein the receiving, by the routing module, second data from any peripheral device of the plurality of peripheral devices comprises:

receiving, by the routing module, the second data from the embedded system board where the any peripheral device is located, and the second data comprises identification information of the any peripheral device.

4. The method according to claim 3, wherein the routing module comprises a routing table, and the routing table comprises a mapping relationship between identification information of the plurality of peripheral devices and the device node channel;

wherein the determining a first device node service for the second data of the plurality of device node services comprises:

determining, by the routing module, a device node channel matching the identification information in the second data based on the routing table.

5. The method according to claim 4, wherein the sending, by the routing module, the second data to the first device node service, so that the first device node service processes the second data comprises:

sending, by the routing module, the second data through the device node channel matching the identification information in the second data, so that the second data is received by the first device node service for the device node channel; and processing, by the first device node service, valid data in the second data, and sending a processing result to a designated application.

6. The method according to claim 5, wherein the device management module further comprises a root node service;

wherein the sending a processing result to a designated application comprises:

sending, by the first device node service, the processing result to the root node service, and forwarding, by the root node service, the processing result to the designated application; or sending, by the first device node service, the processing result to the designated application.

7. The method according to claim 1, further comprising:

after the receiving, by the routing module, first data from any device node service of the plurality of device node services, verifying the first data by the routing module, and discarding the first data in response to a failure of the verification; and/or after the sending, by the routing module, the second data to the first device node service, verifying the second data by the routing module, and discarding the second data in response to a failure of the verification.

8. An electronic device, comprising:

a memory;

a processor; and a computer program stored in the memory and executable in the processor, wherein the program when executed by the processor causes the processor to:

perform at least one of a process of writing data to a plurality of peripheral devices and a process of reading data from the plurality of peripheral devices:

wherein the process of writing data to the plurality of peripheral devices comprises:

receiving, by a routing module, first data from any device node service of a plurality of device node services for the plurality of peripheral devices, and determining a first peripheral device for the first data of the plurality of peripheral device; and sending, by the routing module, the first data to the first peripheral device, so that the first peripheral device operates based on the first data; and wherein the process of the electronic device reading data from the plurality of peripheral devices comprises:

receiving, by the routing module, second data from any peripheral device of the plurality of peripheral devices, and determining a first device node service for the second data of the plurality of device node services; and sending, by the routing module, the second data to the first device node service, so that the first device node service processes the second data, wherein the processer is further configured to:

send, by the any device node service, the first data to the routing module through a device node channel for the any device node service; and wherein the processor is further configured to:
  receive, by the routing module, the first data from the device node channel, and
wherein the processor is further configured to: before sending, by the any device node service, the first data to the routing module through a device node channel for the any device node service,
  receive, by the any device node service, a first invocation request from a designated application for the any device node service, the first invocation request comprises the first data; or
  receive, by a root node service, a second invocation request from a designated application, the second invocation request comprises the first data, and the first data is allocated by the root node service to one or more device node services comprising the any device node service.

9. A computer-readable storage medium, an executable instruction is stored on the computer-readable storage medium, the method according to claim 1 is performed by the processor in response to the processor executing the instruction.

10. The electronic device according to claim 8, wherein the routing module comprises a routing table, and the routing table comprises a mapping relationship between the plurality of peripheral devices and the device node channel; and
  wherein the processor is further configured to: determine, by the routing module, the first peripheral device matching the device node channel transmitting the first data of the plurality of peripheral devices, based on the routing table.

11. The electronic device according to claim 8, wherein the plurality of peripheral devices are allocated to one or more embedded system boards;
  wherein the processor is further configured to: send, by the routing module, the first data to the embedded system board where the first peripheral device is located, and the first data comprises identification information of the first peripheral device; and/or
  wherein the processor is further configured to: receive, by the routing module, the second data from the embedded system board where the any peripheral device is located, and the second data comprises identification information of the any peripheral device.

12. The electronic device according to claim 11, wherein the routing module comprises a routing table, and the routing table comprises a mapping relationship between identification information of the plurality of peripheral devices and the device node channel; and
  wherein the processor is further configured to: determine, by the routing module, a device node channel matching the identification information in the second data based on the routing table.

13. The electronic device according to claim 12, wherein the processor is further configured to:
  send, by the routing module, the second data through the device node channel matching the identification information in the second data, so that the second data is received by the first device node service for the device node channel; and
  process, by the first device node service, valid data in the second data, and send a processing result to a designated application.

14. The electronic device according to claim 13, wherein the processor is further configured to:
  send, by the first device node service, the processing result to a root node service, and forward, by the root node service, the processing result to the designated application; or
  send, by the first device node service, the processing result to the designated application.

15. The electronic device according to claim 8, wherein the processer is further configured to:
  after the receiving, by the routing module, first data from any device node service of the plurality of device node services, verify the first data by the routing module, and discard the first data in response to a failure of the verification; and/or
  after the sending, by the routing module, the second data to the first device node service, verify the second data by the routing module, and discard the second data in response to a failure of the verification.

16. A method for managing a peripheral device for an electronic device, wherein the electronic device comprises a device management module and a routing module, the device management module comprises a plurality of device node services for a plurality of peripheral devices, the plurality of device node services are a plurality of callable services obtained by encapsulating a device management driver of each of the plurality of peripheral devices, the method comprising:
  at least one of a process of the electronic device writing data to the peripheral devices and a process of the electronic device reading data from the peripheral devices,
    wherein the process of the electronic device writing data to the peripheral devices comprises:
      receiving, by the routing module, first data from any device node service of the plurality of device node services, and determining a first peripheral device for the first data of the plurality of peripheral device; and
      sending, by the routing module, the first data to the first peripheral device, so that the first peripheral device operates based on the first data;
    wherein the process of the electronic device reading data from the peripheral devices comprises:
      receiving, by the routing module, second data from any peripheral device of the plurality of peripheral devices, and determining a first device node service for the second data of the plurality of device node services; and
      sending, by the routing module, the second data to the first device node service, so that the first device node service processes the second data.

17. The method according to claim 16, further comprising:
  sending, by the any device node service, the first data to the routing module through a device node channel for the any device node service,
  wherein the receiving, by the routing module, first data from any device node service of the plurality of device node services comprises:
    receiving, by the routing module, the first data from the device node channel.

18. The method according to claim 17, wherein the device management module further comprises a root node service,
  wherein before sending, by the any device node service, the first data to the routing module through a device node channel for the any device node service, the method further comprises:

receiving, by the any device node service, a first invocation request from a designated application for the any device node service, the first invocation request comprises the first data; or receiving, by the root node service, a second invocation request from a designated application, the second invocation request comprises the first data, and the first data is allocated by the root node service to one or more device node services comprising the any device node service.

19. The method according to claim 17, wherein the routing module comprises a routing table, and the routing table comprises a mapping relationship between the plurality of peripheral devices and the device node channel, and wherein the determining a first peripheral device for the first data of the plurality of peripheral devices comprises:

determining, by the routing module, the first peripheral device matching the device node channel transmitting the first data of the plurality of peripheral devices, based on the routing table.

20. The method according to claim 16, wherein the plurality of peripheral devices are allocated to one or more embedded system boards;

wherein the sending, by the routing module, the first data to the first peripheral device comprises:

sending, by the routing module, the first data to the embedded system board where the first peripheral device is located, and the first data comprises identification information of the first peripheral device; and/or wherein the receiving, by the routing module, second data from any peripheral device of the plurality of peripheral devices comprises:

receiving, by the routing module, the second data from the embedded system board where the any peripheral device is located, and the second data comprises identification information of the any peripheral device.

* * * * *